United States Patent Office 3,375,254
Patented Mar. 26, 1968

3,375,254
MANUFACTURE OF 1,2,3,4,6,7-HEXAHYDRO-2-OXO-11bH-BENZO(a)QUINOLIZINES
Harry Tacon Openshaw and Norman Whittaker, London, England, assignors to Burroughs Wellcome & Co. Inc., Tuckahoe, N.Y., a corporation of New York
No Drawing. Continuation-in-part of application Ser. No. 141,581, Sept. 29, 1961. This application Sept. 17, 1965, Ser. No. 488,258
11 Claims. (Cl. 260—289)

ABSTRACT OF THE DISCLOSURE 1,2,3,4,6,7 - hexahydro - 2 - oxo - 11bH - benzo(a) quinolizines, of value for their pharmacological activity and as intermediates in the synthesis of emetine, are prepared by reaction of 3,4 - dihydroisoquinolines in which the 6 and 7 positions are substituted by hydrogen, methoxy, ethoxy, or a methylenedioxy group as a free base with the cation of a Mannich base having the formula, $$Z^1Z^2Z^3N^+.CH_2.CHR^3.CO.CH_3$$

in which $Z^1$ is hydrogen or lower alkyl, $Z^2$ and $Z^3$ are lower alkyl or a combination forming a morpholine, pyrrolidine, or piperidine ring, and $R^3$ is hydrogen or lower alkyl.

---

This invention relates to the preparation of 1,2,3,4,6,7-hexahydro-2-oxo-11bH-benzo(a)quinolizines. The application is a continuation-in-part of application No. 141,581 of the 26th September, 1961.

1,2,3,4,6,7 - hexahydro - 2 - oxo - 11bH-benzo(a)quinolizines of Formula I include compounds which are of value for their pharmacological activity and also as intermediates in the synthesis of emetine.

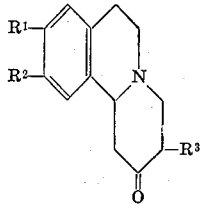

(I)

In this and the subsequent formulae $R^1$ and $R^2$ are hydrogen atoms or methoxy or ethoxy groups or together form a methylenedioxy group and $R^3$ is a hydrogen atom or a lower alkyl group. Especially favorable pharmacological activity has been described for 1,2,3,4,6,7 - hexahydro-3-isobutyl - 9,10 - dimethoxy - 2 - oxo - 11bH - benzo(a) quinolizine and has been found in 3-ethyl-1,2,3,4,6,7-hexahydro - 9,10 - dimethoxy - 2 - oxo - 11bH - benzo(a) quinolizine, and the latter compound is the one required for the syntheses of emetine and 2-dehydroemetine.

It has been disclosed in U.S. Patent No. 3,009,918 that benzo(a)quinolizine derivatives can be obtained by oxidizing a Mannich base (III) derived from a 1,2,3,4-tetrahydroisoquinoline with a suitable oxidizing agents to give a 1,2,3,4,6,7 - hexahydro - 2 - oxo - 11bH - benzo(a) quinolizine (I).

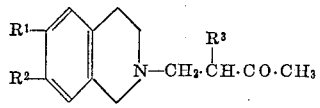

(III)

The oxidation of the Mannich base (III) to the benzo (a)quinolizine (I) is effected by any agent capable of oxidizing a 2-substituted 1,2,3,4-tetrahydroisoquinoline to the corresponding 3,4 - dihydroisoquinolinium salt. Convenient exmaples of such agents are solutions of mercuric acetate, ferric chloride, chlorine, bromine or iodine.

These compounds were previously made by multi-stage processes, involving the Dieckmann cyclisation of appropriate di-esters (Battersby and Openshaw, Experientia, 1950, 6, 387; Brossi et al., Helv. Chim. Acta, 1958, 41, 119). A shorter method has been described by Brossi et al. (Helv. Chim. Acta, 1960, 43, 583) who reacted 3-methylidene - pentan-2-one with 6,7-dimethoxyisoquinoline in the presence of sodium hydroxide to form 3-ethyl-1,2,3,4, 6,7 - hexahydro - 9,10 - dimethoxy - 2 - oxo-11bH-benzo (a)quinolizine in 11% yield, calculated on the first-named reactant. As this reactant was produced by the action of sodium hydroxide on the methiodide of 3-dimethylaminomethylpentan-2-one in a yield of 32%, the overall yield of the process, based on the latter, was only 3.5%.

The object of the present invention is to produce these substituted 1,2,3,4,6,7 - hexahydro - 2 - oxo - 11bH-benzo (a)quinolizines by an efficient and improved process providing the product at a satisfactory yield.

According to the present invention there is provided a method for the preparation of a 1,2,3,4,6,7-hexahydro-2-oxo-11bH-benzo(a)-quinolizine of Formula I, which comprises reacting a correspondingly substituted dihydroisoquinoline of Formula II

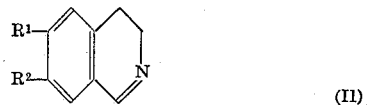

(II)

with a salt, selected from the class consisting of acid addition and quaternary salts of Mannich bases of Formula IV,

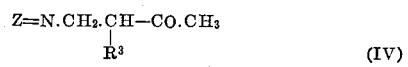

(IV)

wherein ZN is an amino group compatible with the reactants, present in a cationic form in a medium containing a polar solvent, which is substantially free of alkalinity apart from the intrinsic alkalinity of the reagents, and may optionally contain acid in a quantity insufficient to neutralise the whole of the dihydroisoquinoline present. Alternatively, a method for the preparation of a compound of Formula I comprises reacting a correspondingly substituted dihydroisoquinoline of Formula II with a Mannich base of Formula IV in a medium containing a polar solvent free of alkalinity apart from the intrinsic alkalinity of the reagents, and acid at least in a quantity necessary to partially neutralise the Mannich base but less than necessary to neutralise the combined amounts of Mannich base and dihydroisoquinoline present.

In this reaction, amine interchange leads to the elimination of the amino group originally present in the Mannich base and, it is believed, to the formation of a 3,4-dihydroisoquinolinium cation which cyclises spontaneously to give the product of Formula I.

The conditions essential for the occurrence of the claimed reaction are that the Mannich base shall be in the form of a cation, and that the dihydroisoquinoline of Formula II shall be in the non-ionised form, i.e., as the free base. Thus, no appreciable reaction occurs between the free Mannich base of Formula IV and the dihydroisoquinoline of formula II, in the absence of any acid. Also, no appreciable reaction occurs between the cationic form of the Mannich base and the dihydroisoquinoline of Formula II in the presence of sufficient additional strong acid (not less than 1 equivalent) to convert all the latter into its conjugate cation.

It is therefore essential that, in carrying out the reaction, no strongly alkaline reagent should be present, which would cause the conversion of the acid addition salt of the Mannich base into the unreactive, free base, or bring about the decomposition of a quaternary salt of the Mannich base into the relatively ineffective unsaturated ketone.

It is also important that the conditions should not be sufficiently acid to cause the complete conversion of the dihydroisoquinoline reactant into its conjugate cation. Preferably, the dihydroisoquinoline can be treated with a quaternary salt of the Mannich base, in the absence of added acid or alkali, or with the Mannich base itself together with one equivalent of a strong acid, or more than one equivalent of a weak acid. As a strong acid in an aqueous medium, hydrochloric acid, sulfuric acid, toluene sulfonic acid or camphor-10-sulfonic acid may, for instance, be employed, although it would be obvious to those skilled in the art to use other acids as well. As a weak acid, for instance, benzoic acid or 2 mole equivalents of acetic acid has given satisfactory results. These conditions represent an acid or neutral pH in an aqueous medium when tested with phenolphthalein, without necessarily implying a similar pH in a non-aqueous or mixed solvent system.

As a matter of practical convenience, the reactants may be introduced in the form of the free Mannich base and the acid addition salt of the dihydroisoquinoline, but it will be understood that, in solution, the acid will be transferred from the weaker base, the dihydroisoquinoline, to the stronger Mannich base, so that in effect there are present in the reaction medium the salt of the latter and the free base of the former.

Because the amino group of the Mannich base of Formula IV is eliminated and does not appear in the product of Formula I, the precise nature and identity of the amine, which is used to form the Mannich base by methods known per se, is irrelevant, provided it is compatible with the reactants. For the purpose of the present invention Mannich bases forming a cation of Formula V have been found convenient for use.

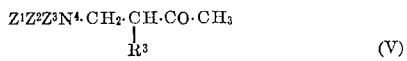

(V)

In the Formula V, $R^3$ is as hereinbefore defined, $Z^1$ is selected from the class consisting of the hydrogen atom and the lower alkyl groups, and $Z^2$ and $Z^3$ taken together contain a total of up to 5 carbon atoms, and are each selected from the class consisting of lower alkyl groups and a combination of the two together forming a ring with an optional oxygen atom and an optional other nitrogen atom in the ring. Lower alkyl groups may contain up to 5 carbon atoms, and an example for the ring is for instance a morpholino, pyrrolidino or piperidino group. The amines used to form the Mannich base usually have a molecular weight not greater than M=101. It is, however, preferred to use a Mannich base of the Formula V, in which $Z^1$ is selected from the class of the hydrogen atom and the methyl group and $Z^2$ and $Z^3$ are each selected from the class consisting of methyl and ethyl groups.

The Mannich bases may conveniently be made by reacting a secondary amine with formaldehyde and an alkane-2-one or 2-alkyl-3-oxo-butyric acid.

The process according to the present invention is different from and superior to that described in U.S. Patent No. 3,009,918, as it gives a noticeably greater yield of the product of Formula I and has the practical advantages, important in large-scale manufacture, of avoiding the use of mercuric acetate and requiring smaller volumes of solvent.

The following examples illustrate the invention.

*Example 1.*—A solution of 3,4-dihydro-6,7-dimethoxyisoquinoline (265 g.) in alcohol (2650 ml.) was treated with 3 - dimethylaminomethyl-pentan-2-one methiodide (397 g.), and refluxed for 1 hour. The cooled mixture was diluted with water (2200 ml.) and the alcohol was evaporated in vacuo. The residual aqueous suspension of solid was shaken with chloroform (550 ml.) and a slight excess of aqueous potassium hydroxide, filtered from a small quantity of sediment, and the chloroform layer was separated, washed with water, dried over sodium sulfate, and evaporated. The residual viscous oil was dissolved in hot alcohol (550 ml.), and the solution was evaporated, leaving a mass of sticky crystals. A solution of the crystals in hot alcohol (550 ml.) was set aside at room temperature, and then at 0° C., giving colorless needles of 3-ethyl-1,2,3,4,6,7 - hexahydro - 9,10 - dimethoxy - 2 - oxo-11bH-benzo(a)quinolizine (250.8 g.), M.P. 110–111° C. Concentration of the alcoholic liquors yielded more benzo(a)-quinolizine (35.7 g.), M.P. 109–110° C. The alcoholic liquors were diluted with alcohol to 600 ml., treated with powdered hydroxylamine hydrochloride (45 g.), heated to boiling, and then set aside at room temperature overnight, giving crystals of the sparingly soluble 3-ethyl-1,2,3,4,6,7 - hexahydro-9,10-dimethoxy-2-oximino - 11bH-benzo(a)quinolizine hydrochloride (31.7 g.), M.P. 239–240° C. (efferv.). This compound is readily reconverted to the above 2-oxo-benzo(a)quinolizine by reacting with formaldehyde in the presence of aqueous hydrochloric acid at room temperature.

*Example 2.*—A solution of 3,4-dihydro-6,7-dimethoxy-isoquinoline (1 g.) in alcohol (5 ml.) was treated with 3-dimethylaminomethyl-pentan-2-one (1.5 g.) and glacial acetic acid (0.7 ml.), and refluxed for 2 hours. The reaction solution was diluted with alcohol to 40 ml., and the 3-ethyl-1,2,3,4,6,7-hexahydro - 9,10 - dimethoxy - 2 - oxo-11bH-benzo(a)quinolizine present in the solution was isolated as the oxime hydrochloride (0.80 g.), M.P. 242° C. (efferv.), in the manner of Example 1.

*Example 3.*—3,4 - dihydro - 6,7-dimethoxyisoquinoline hydrochloride trihydrate (1.47 g.) was added to a solution of 3-dimethylaminomethyl-pentan-2-one (0.75 g.) in alcohol (10 ml.). The resulting solution was refluxed for 1 hour, yielding 3-ethyl-1,2,3,4,6,7-hexahydro-9,10-dimethoxy-2-oxo-11bH-benzo(a)quinolizine, which was isolated as the oxime hydrochloride (0.735 g.), M.P. 242° C. (efferv.).

*Example 4.*—A solution of 3,4-dihydro-6,7-dimethoxy-isoquinoline (1 g.) in alcohol (5 ml.) was treated with 3-diethylaminomethyl-pentan-2-one (1.79 g.) and glacial acetic acid (0.72 ml.), and refluxed for 2 hours. From the reaction solution 3-ethyl-1,2,3,4,6,7-hexahydro-9,10-dimethoxy-2-oxo-11bH-benzo(a)quinolizine was isolated as the oxime hydrochloride (0.90 g.), M.P. 242° C. (efferv.).

*Example 5.*—A solution of 3-diethylaminomethyl-pentan-2-one (1.79 g.) in ethyl acetate (3 ml.) was treated with methyl iodide (1 ml.), and set aside at room temperature overnight. The solvent was decanted from the gummy 3-diethylaminomethyl-pentan-2-one methiodide, which was set aside in vacuo to remove traces of methyl iodide, then treated with a solution of 3,4-dihydro-6,7-dimethoxyisoquinoline (1 g.) in alcohol (10 ml.). The resulting solution was refluxed for 1 hour, and worked up in the manner of Example 1, yielding 3-ethyl-1,2,3,4,6,7-hexahydro-9,10-dimethoxy-2-oxo-11bH - benzo(a)quinolizine, which was isolated as the oxime hydrochloride, M.P. 242° C. (efferv.).

*Example 6.*—A solution of 3,4-dihydroisoquinoline (10 g.) in alcohol (100 ml.) was treated with 3-dimethylaminomethyl-pentan-2-one methiodide (21.8 g.), and refluxed for 1 hour. The crude base, derived from the reaction mixture in the manner of Example 1, was freed from traces of chloroform by digesting with hot light petroleum (B.P. 60–80° C.) and evaporating the light petroleum. The base was then extracted with hot light petroleum (B.P. 60–80° C.), the extract was filtered from resin, evaporated, and the residual gum was crystallised from alcohol to give colorless prisms of 3-ethyl-1,2,3,4,6,7-hexahydro - 2 - oxo-11bH-benzo(a)quinolizine (4.06 g.), M.P. 99–100° C. From the alcoholic liquors a further quantity of the benzo(a)quinolizine was isolated as the oxime hydrochloride (0.91 g.), M.P. 240° C. (efferv.).

*Example 7.*—A solution of 3,4-dihydro-6,7-dimethoxy-isoquinoline (20 g.) in alcohol (200 ml.) was treated with 3-dimethylaminoethylheptan-2-one methiodide (32.8 g.) and heated under reflux for one hour. The reaction mixture was worked up in the manner of Example 1 to give 3-butyl-1,2,3,4,6,7-hexahydro-9,10-dimethoxy-2-oxo-11bH-benzo(a)quinolizine (21.2 g.), M.P. 112–113° C.

*Example 8.*—A solution of 3-dimethylaminomethylpentan-2-one (1.12 g.) and an equivalent quantity of glacial acetic acid (0.47 g.) in alcohol (6 ml.) was treated with 3,4-dihydro-6,7-dimethoxyisoquinoline (1.36 g.) and refluxed for 4 hours. The reaction solution was treated with a solution of hydroxylamine hydrochloride (0.85 g.) in alcohol (30 ml.) and heated to boiling, giving the oxime-hydrochloride (1.16 g., 48%), M.P. 245° C. (efferv.), of 3-ethyl-1,2,3,4,6,7-hexahydro-9,10-dimethoxy-2-oxo-11bH-benzo(a)quinolizine.

*Example 9.*—When two equivalents of acetic acid were used in the procedure of Example 8, the yield of the oxime-hydrochloride was 1.54 g. (63%).

*Example 10.*—When three equivalents of acetic acid were used in the procedure of Example 8, the yield of the oxime-hydrochloride was 1.69 g. (70%).

*Example 11.*—A solution of 3-dimethylaminomethylpentan-2-one (1.12 g.) and 3,4-dihydro-6,7-dimethoxyisoquinoline (1.36 g.) in glacial acetic acid (6 ml.) was heated on the steam-bath for 4 hours. The acetic acid was evaporated in vacuo and from the residue 3-ethyl-1,2,3,4,6,7-hexahydro - 9,10 - dimethoxy-2-oxo-11bH-benzo(a)quinolizine was isolated as the oxime-hydrochloride (1.59 g., 65%).

*Example 12.*—When a solution of 3,4-dihydro-6,7-dimethoxyisoquinoline (1.36 g.) and 3-dimethylaminomethylpentan-2-one (1.12 g.) in alcohol (6 ml.) was refluxed for 4 hours, no benzo(a)quinolizine was formed.

*Example 13.*—A solution of 3,4-dihydro-6,7-dimethoxyisoquinoline (1.36 g.) in alcohol (6 ml.) containing 0.5 equivalent of hydrochloric acid was treated with 3-dimethylaminomethylpentan-2-one (1.12 g.) and refluxed for 2½ hours. From the reaction solution 3-ethyl-1,2,3,-4,6,7-hexahydro-9,10-dimethoxy - 2 - oxo-11bH-benzo(a)quinolizine was isolated as the oxime-hydrochloride (1.03 g., 43%), M.P. 243° C. (efferv.).

*Example 14.*—When one equivalent of hydrochloric acid was used in the procedure of Example 13, the yield of the oxime-hydrochloride was 1.98 g. (82%).

*Example 15.*—When 1.55 equivalents of hydrochloric acid were used in the procedure of Example 13, the yield of the oxime-hydrochloride was 1.56 g. (64%).

*Example 16.*—When 2.1 equivalents of hydrochloric acid were used in the procedure of Example 13, no benzo(a)quinolizine was formed.

*Example 17.*—A solution of 3,4-dihydro-6,7-dimethoxyisoquinoline hydrochloride trihydrate (10 g.) and 3-dimethylaminomethylpentan-2-one (5.60 g.) in cold water (30 ml.) was set aside at room temperature. After about 30 minutes, crystallisation began, and after 29 hours the resulting mass of crystals was triturated under ice-cold water (50 ml.), collected, and identified as 3-ethyl-1,2,3,4,6,7-hexahydro - 9,10-dimethoxy-2-oxo-11bH-benzo(a)quinolizine, M.P. 109–110° C. (9.66 g., 94%).

*Example 18.*—A solution of 3,4-dihydro-6,7-dimethoxyisoquinoline (1.36 g.) in alcohol (6 ml.) was treated with an equivalent quantity of toluene-p-sulfonic acid (1.23 g.) followed by 3-dimethylaminomethylpentan-2-one (1.12 g.) and refluxed for 2½ hours. From the reaction solution 3-ethyl-1,2,3,4,6,7-hexahydro-9,10-dimethoxy-2-oxo-11bH-benzo(a)quinolizine was isolated as the oxime-hydrochloride (1.44 g., 59%), M.P. 245° C. (efferv.).

*Example 19.*—When an equivalent quantity of d-camphor-10-sulfonic acid was used in place of toluene-p-sulfonic acid in the procedure of Example 18, the yield of the oxime-hydrochloride was 1.19 g. (49%).

*Example 20.*—When an equivalent quantity of sulphuric acid was used in place of toluene-p-sulphonic acid in the procedure of Example 18, the 3-ethyl-1,2,3,4,6,7-hexahydro-9,10-dimethoxy-2-oxo - 11bH-benzo(a)quino- lizine produced was isolated as the free base, and converted into the oxime-hydrochloride (1.05 g., 43%), M.P. 244° C. (efferv.).

*Example 21.*—A solution of 3,4-dihydro-6,7-dimethoxyisoquinoline (10 g.) and benzoic acid (6.5 g.) in water (20 ml.) was treated with 3-dimethylaminomethylbutan-2-one (6.8 g.), seeded with crystals of product, and set aside at room temperature for 2 days. The resulting crystals were collected and washed with water, giving 11 g. (76%), M.P. 135–136° C., of 1,2,3,4,6,7-hexahydro-9,10-dimethoxy-3-methyl-2-oxo-11bH-benzo(a)quinolizine.

*Example 22.*—A solution of 3,4-dihydro-6,7-dimethoxyisoquinoline (10 g.) in water (35 ml.) was brought to pH 3 by addition of concentrated aqueous hydrochloric acid, treated with 3-dimethylaminomethylbutan-2-one (7 g.), and seeded with crystals of product. After keeping at room temperature for 1 day, the resulting crystals were collected and washed with water, giving 13 g. (90%) of 1,2,3,4,6,7-hexahydro-9,10-dimethoxy-3-methyl-2-oxo-11bH-benzo(a)quinolizine.

What is claimed is:

1. A method for the preparation of a 1,2,3,4,6,7-hexahydro-2-oxo-11bH-benzo(a)quinolizine of Formula I,

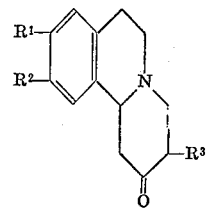

(I)

wherein $R^1$ and $R^2$ are each selected from the class consisting of hydrogen, methoxy, and ethoxy and a combination of the two together forming methylenedioxy, and $R^3$ is selected from the class consisting of hydrogen and lower alkyl, which method comprises reacting a correspondingly substituted dihydroisoquinoline of Formula II,

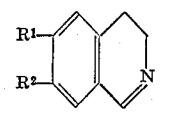

(II)

as a free base with a cation of a Mannich base, selected from the class consisting of acid addition and quaternary salts thereof, having the Formula V,

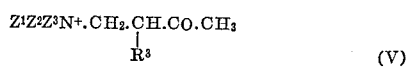

(V)

wherein $Z^1$ is selected from the class consisting of hydrogen and lower alkyl, $Z^2$ and $Z^3$ are each selected from the class consisting of lower alkyl and a combination of the two together forming a ring selected from the class consisting of morpholine, pyrrolidine, and piperidine, and $R^3$ is as designated in Formula I.

2. A method for the preparation of a 1,2,3,4,6,7-hexahydro-2-oxo-11bH-benzo(a)quinolizine of Formula I

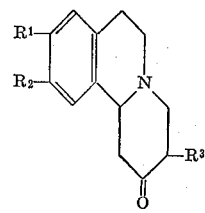

(I)

wherein $R^1$ and $R^2$ are each selected from the class consisting of hydrogen, methoxy, and ethoxy and a combination of the two together forming a methylenedioxy, and $R^3$ is selected from the class consisting of hydrogen and lower alkyl, which comprises reacting a correspondingly substituted dihydroisoquinoline of Formula II,

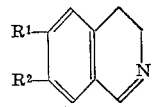
(II)

as a free base with a Mannich base cation having the Formula V,

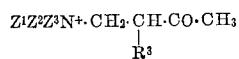
(V)

wherein $Z^1$ is hydrogen, $Z^2$ and $Z^3$ are each selected from the class consisting of lower alkyl and a combination of the two together forming a ring selected from the class consisting of morpholine, pyrrolidine, and piperidine, and $R^3$ is as designated in Formula I, in a medium comprising a substantially non-alkaline polar solvent and acid, said Mannich cation (V) being produced by addition of acid to the corresponding free Mannich base in quantity ranging from the amount necessary to partially neutralize said Mannich base to less than required to completely neutralize the combined amounts of said Mannich base and said dihydroisoquinoline (II) present.

3. A method for the preparation of 3-ethyl-1,2,3,4,6,7-hexahydro - 9,10 - dimethoxy-2-oxo-11bH-benzo(a)quinolizine, which comprises reacting 3,4-dihydro-6,7-dimethoxyisoquinoline with a Mannich base salt having the cation of Formula V,

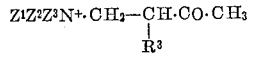
(V)

wherein $Z^1$ is selected from the class consisting of hydrogen and lower alkyl, $Z^2$ and $Z^3$ are each selected from the class consisting of lower alkyl and a combination of the two together forming a ring selected from the class consisting of morpholine, pyrrolidine, and piperidine, and $R^3$ is ethyl, present in a cationic form in a medium comprising alcohol and water.

4. A method for the preparation of 1,2,3,4,6,7-hexahydro-9,10-dimethoxy - 3 - methyl-2-oxo-11bH-benzo(a)quinolizine, which comprises reacting 3,4-dihydro-6,7-dimethoxyisoquinoline with a Mannich base salt having a cation of Formula V,

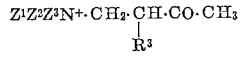
(V)

wherein $Z^1$ is selected from the class consisting of hydrogen and lower alkyl, $Z^2$ and $Z^3$ are each selected from the class consisting of lower alkyl and a combination of the two together forming a ring selected from the class consisting of morpholine, pyrrolidine, and piperidine, and $R^3$ is methyl, present in a cationic form in a medium comprising alcohol and water.

5. A method for the preparation of 1,2,3,4,6,7-hexahydro-2-oxo-11bH-benzo(a)quinolizines of Formula I

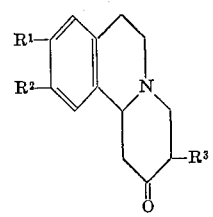
(I)

in which formula $R^1$ and $R^2$ are each selected from the class consisting of the hydrogen atom, methoxy and ethoxy groups and a combination of the two together forming a methylene-dioxy group, and $R^3$ is selected from the class consisting of the hydrogen atom and the lower alkyl groups, which comprises reacting a correspondingly substituted 3,4-dihydro-isoquinoline of Formula II as a free case

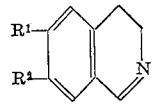
(II)

with a Mannich base, selected from the group consisting of 3-dimethylaminomethylbutan-2-one, 3-diethylaminomethylbutan-2-one, 3-dimethylaminomethylpentan-2-one, 3-diethylaminomethylpentan - 2 - one, 3-dimethylaminomethyl-heptan-2-one, and 3-diethylaminomethyl-heptan-2-one, in a medium comprising water, alcohol and acid in an amount ranging from the amount necessary to partially neutralize said Mannich base but less than necessary to neutralize the combined amounts of said Mannich base and the substituted dihydroisoquinoline.

6. A method according to claim 5, in which an acid addition salt of the dihydro isoquinoline compound of Formula II and the free Mannich base are initially dissolved in a medium comprising alcohol and water.

7. A method according to claim 5, in which the medium contains a strong acid in a quantity between about 0.5 and 1.5 equivalents, calculated on the Mannich base.

8. A method according to claim 5, in which the acid consists of about three moles of weak acid.

9. A method according to claim 8, in which the weak acid is selected from the class consisting of benzoic and acetic acid.

10. A method according to claim 7, in which the acid is selected from the class consisting of hydrochloric acid, sulphuric acid, toluene sulfonic acid, and camphor-10-sulfonic acid.

11. A method for the preparation of a 3-alkyl-1,2,3,4,6,7-hexahydro-9,10-dimethoxy - 2 - oxo-11bH-benzo(a) quinolizine wherein the 3-alkyl group is selected from the class consisting of methyl and ethyl, which comprises reacting 3,4-dihydro-6,7-dimethoxyisoquinoline with a methyl halide quaternary salt of a Mannich base whose cation is of Formula V

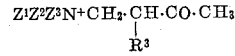

wherein $Z^1$ is methyl, $Z^2$ and $Z^3$ are each selected from the class consisting of methyl and ethyl, and $R^3$ is selected from the class consisting of ethyl and methyl in alcoholic solution.

References Cited

UNITED STATES PATENTS 3,009,918  11/1961  Openshaw et al. _____ 260—289

ALEX MAZEL, *Primary Examiner.*

NICHOLAS S. RIZZO, *Examiner.*

D. DAUS, *Assistant Examiner.*